United States Patent
Chang

(10) Patent No.: US 7,577,352 B2
(45) Date of Patent: Aug. 18, 2009

(54) MOBILE COMMUNICATION DEVICE

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 278 days.

(21) Appl. No.: 11/614,407

(22) Filed: Dec. 21, 2006

(65) Prior Publication Data
US 2008/0031612 A1 Feb. 7, 2008

(30) Foreign Application Priority Data
Aug. 4, 2006 (CN) .................... 2006 1 0061982

(51) Int. Cl.
G03B 13/32 (2006.01)
G03B 17/00 (2006.01)
G03B 19/00 (2006.01)

(52) U.S. Cl. .................... 396/144; 396/72; 396/76; 396/79; 396/121; 396/429; 348/345; 348/374

(58) Field of Classification Search ................ 396/144, 396/72, 76, 79
See application file for complete search history.

(56) References Cited

U.S. PATENT DOCUMENTS

| 4,206,982 | A | * | 6/1980 | Osanai | ................... 352/140 |
|---|---|---|---|---|---|
| 5,970,262 | A | * | 10/1999 | Tseng et al. | ................ 396/144 |
| 7,127,162 | B2 | * | 10/2006 | Mano | ......................... 396/144 |
| 2004/0263999 | A1 | * | 12/2004 | Chan et al. | ................... 359/699 |
| 2005/0054398 | A1 | * | 3/2005 | Kim | ....................... 455/575.4 |
| 2005/0264678 | A1 | * | 12/2005 | Butterworth | ................ 348/345 |
| 2006/0018654 | A1 | * | 1/2006 | Nuno et al. | ................. 396/349 |
| 2007/0009246 | A1 | * | 1/2007 | Lee | ............................ 396/72 |
| 2007/0077051 | A1 | * | 4/2007 | Toor et al. | .................... 396/144 |

* cited by examiner

Primary Examiner—W. B. Perkey
Assistant Examiner—Dennis Hancock
(74) Attorney, Agent, or Firm—Clifford O. Chi

(57) ABSTRACT

A mobile communication device includes a first part and a second part. The first part has a camera module mounted therein, which includes a lens-barrel and a focusing mechanism engaged with the lens barrel. Wherein the focusing mechanism has a focusing lever. The second part is movably attached to the first part between a first position and a second position. The second part further has a first and second lever-driving portions for driving the focusing lever to rotate between a first focus position where the focusing lever is located adjacent to the first lever-driving portion and the second is moved to the first position, and a second focus position where the focusing lever is located adjacent to the second lever-driving portion and the second part is moved to the second position.

13 Claims, 8 Drawing Sheets

MOBILE COMMUNICATION DEVICE

BACKGROUND OF THE INVENTION

1. Field of the Invention

The present invention relates to mobile communication devices and, more particularly, to a communication device having a camera module.

2. Description of Related Art

The use of pocket-size mobile communication devices such as mobile phones has increased substantially in recent years. It is very common for people to take mobile communication devices with them when they are away from land-line based communication facilities. Over time, many additional facilities have been added to them, for example, cameras, computer games, MP3s etc.

However, Most cameras installed in the mobile communication device just have lens modules with invariable focal length. Therefore, when taking photos of objects close to or far from the camera, the objects on the photo may not be in focus.

What is needed, therefore, is a mobile communication device that has a focusing function.

SUMMARY OF THE INVENTION

In a first preferred embodiment of the present invention, a mobile communication device includes a first part and a second part. The first part has a camera module mounted therein, and the camera module includes a lens-barrel and a focusing mechanism engaged with the lens barrel, wherein the focusing mechanism has a focusing lever. The second part has a display module mounted therein and is movably attached to the first part between a first position and a second position. The second part also has a first and second lever-driving portions for driving the focusing lever to rotate between a first focus position where the focusing lever is located adjacent to the first lever-driving portion and the second part is in the first position, and a second focus position where the focusing lever is located adjacent to the second lever-driving portion and the second part is in the second position.

In a second preferred embodiment of the present invention, a mobile communication device includes a first part and a second part. The first part has a focusing camera module mounted therein, and the focusing camera module includes a lens assembly and a focusing mechanism for focusing of the lens assembly. The focusing mechanism has a focusing lever rotatable between a first focus position and a second focus position. The second part has first and second lever-driving portions for driving the focusing lever to rotate between the first and second focus positions. The second part is attached to the first part and is slidable relative to the first part between a first position where the focusing lever is in the first focus position and is located adjacent to the first lever-driving portion, and a second position where the focusing lever is in the second focus position and is located adjacent to the second lever-driving portion.

Advantages and novel features will become more apparent from the following detailed description of the present mobile communication device, when taken in conjunction with the accompanying drawings.

BRIEF DESCRIPTION OF THE DRAWINGS

Many aspects of the present mobile communication device can be better understood with reference to the following drawings. The components in the drawings are not necessarily drawn to scale, the emphasis instead being placed upon clearly illustrating the principles of the present mobile communication device. Moreover, in the drawings, like reference numerals designate corresponding parts throughout the several views.

DETAILED DESCRIPTION OF THE INVENTION

Reference will now be made to the drawings to describe preferred embodiments of the present mobile communication device.

Figure 1:
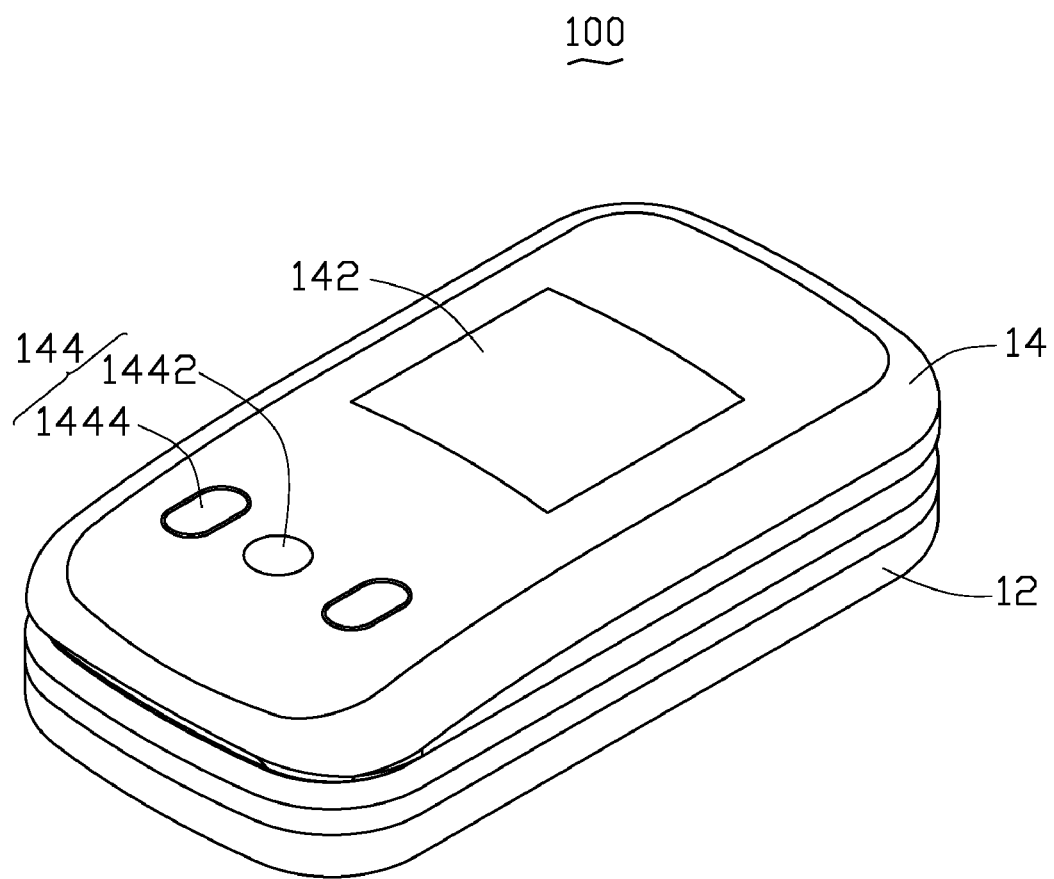
FIG. 1 is a schematic, isometric view of a mobile communication device in accordance with a preferred embodiment.
Figure 2:
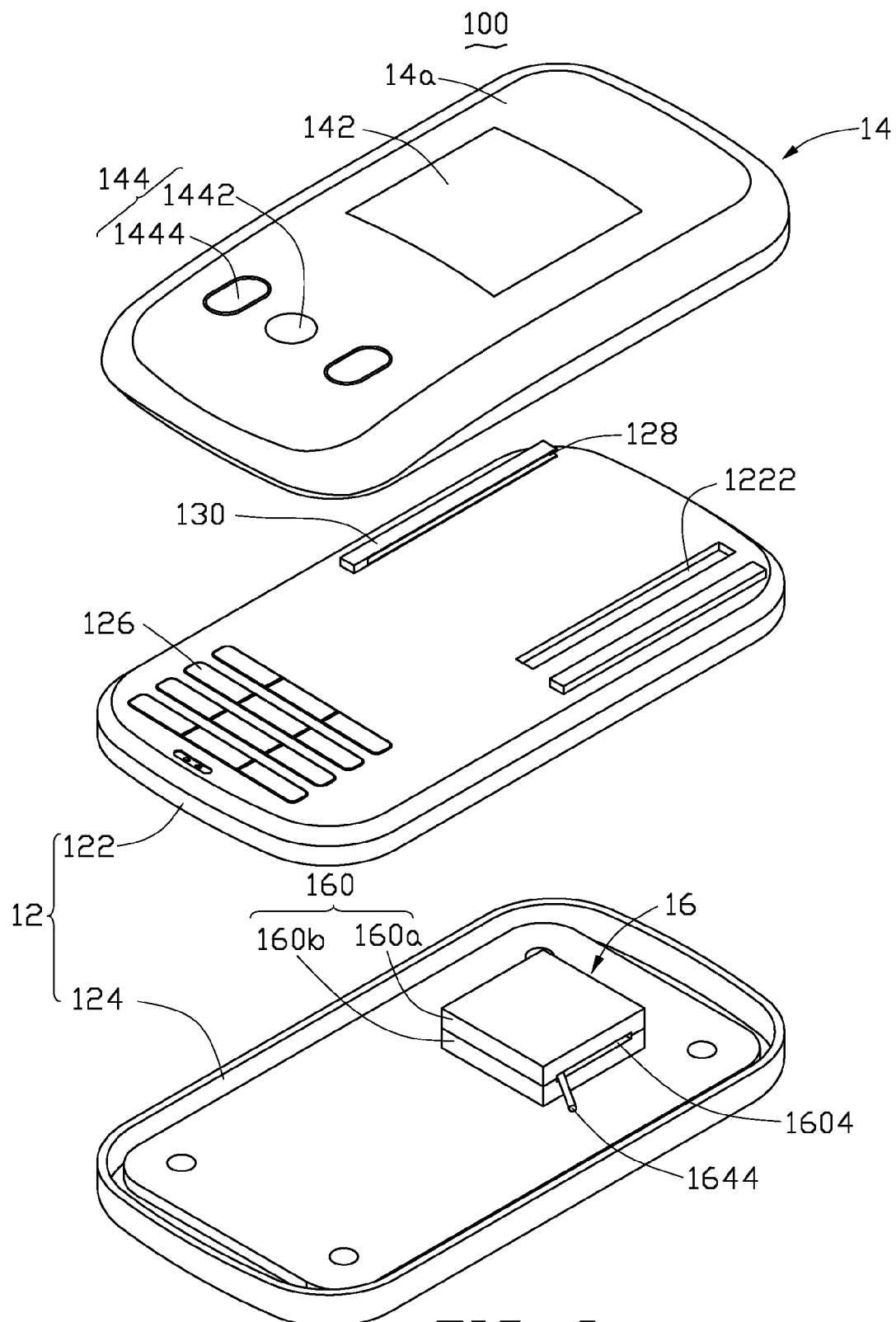
FIG. 2 is a schematic, exploded isometric view of the mobile communication device shown in FIG. 1, the mobile communication device including a first part, a second part and a camera module.
Figure 3:
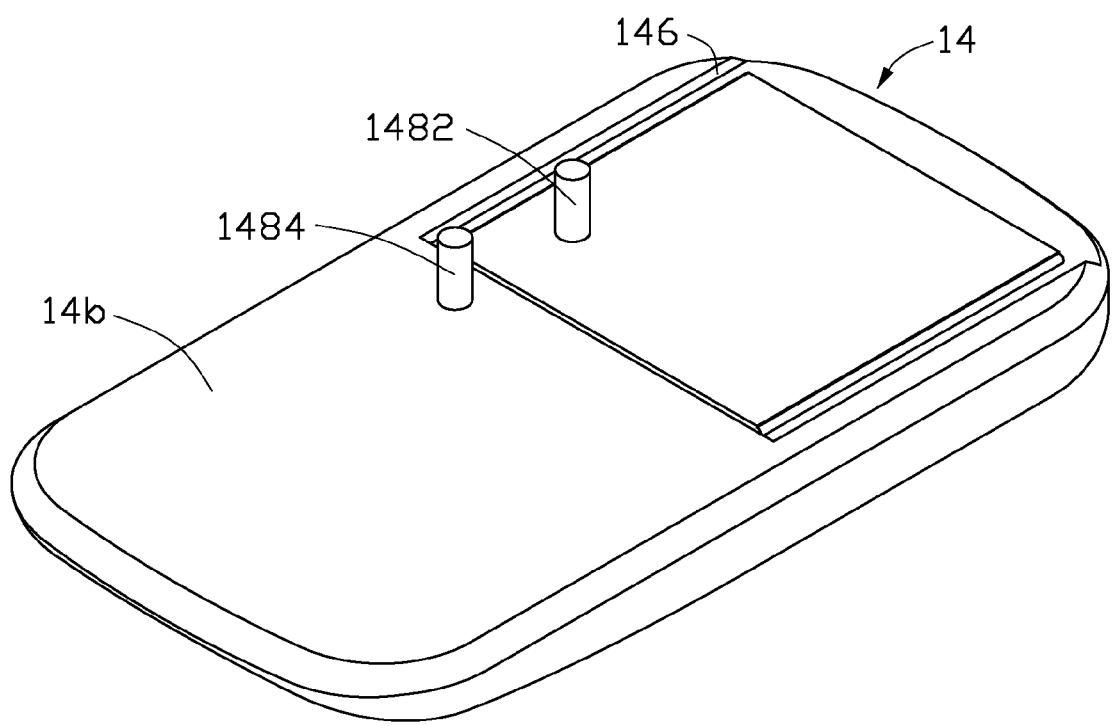
FIG. 3 is a schematic, isometric view of the second part of the mobile communication device shown in FIG. 2 from another visual angle.

FIGS. 1 to 3 illustrate a mobile communication device 100 in accordance with a preferred embodiment. The mobile communication device 100 includes a first part 12, a second part 14 and a camera module 16. The camera module 16 is mounted in the first part 12.

The first part 12 includes a front cover 122 and a back cover 124 facing each other. The front cover 122 and the back cover 124 can be connected to each other by a fastener (not shown).

The front cover 122 includes a first keypad 126 and two guideways 130. The two guideways 130 protrude from a surface of the front cover 122 and are parallel with each other. The first keypad 126 is used for inputting words and numerals etc. Two sliding slots 128 are defined on two sidewalls of the two guideways 130. Additionally, the front cover 122 defines a first through hole 1222 therein that is strip-shaped and parallel with the guideways 130.

The back cover 124 faces the front cover 122 and the camera module 16 is mounted on the back cover 124. The camera module 16 includes a casing 160 consisting of a first casing part 160a and a second casing part 160b assembled to each other. The second casing part 160b is fixed on an inner surface of the back cover 124. Other elements of the camera module 16 are illustrated in FIG. 4.

The second part 14 has a front surface 14a and a back surface 14b facing the front cover 122. A display module 142 is mounted in the second part 14 and can be seen from the front surface 14a. A second keypad 144 is set adjacent to the display module 142. In this preferred embodiment, the second keypad 144 includes a shutter button 1442 and other functional keys 1444, the shutter button 1442 is used for shooting. Two sliding rails 146 are formed on the back surface 14b and match the two guideways 130 so that the second part 14 can mate with and slide relative to the first part 12. The sliding rails 146 and the guideways 130 are defined as a sliding assembly. In addition, two lever-driving portions 1482 and 1484 are formed on the back surface 14b and configured for extending through and moving along the first through hole 1222 defined in the front cover 122. It is to be understood that the sliding assembly can be formed by other mechanism structures.

Figure 4:
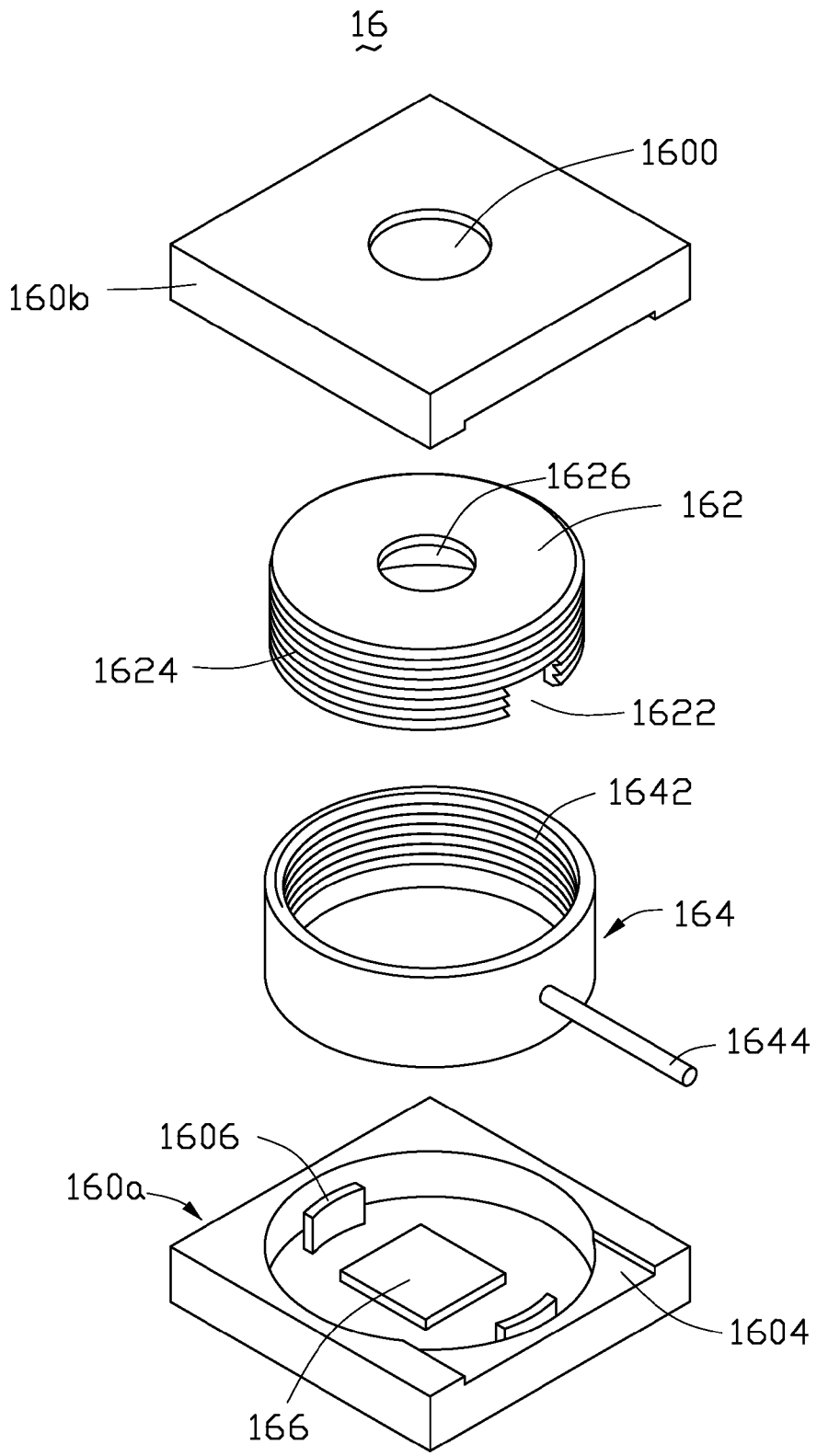
FIG. 4 is a schematic, exploded isometric view of the camera of the mobile communication device shown in FIG. 2.

Referring to FIG. 4, the camera module 16 further includes a lens-barrel 162, a focusing mechanism 164 and an image sensor 166. The lens-barrel 162 is received in the casing 160 and at least one lens module (not shown) is received in the lens-barrel 162. At least one cutout 1622 is defined in one end of the lens-barrel 162. Correspondingly, the first casing part 160a includes a rotation-blocking protrusion 1606 protruding from an inner surface of the first casing part 160a and configured for engagement in the cutout 1622 of the lens barrel 162 thereby preventing the lens-barrel 162 from rotating. Additionally, the lens-barrel 162 defines a first screw thread structure 1624 on an outer surface thereof and a light-through aperture 1626 therein. The middle of the light-through aperture 1626 is in an optical axis of the lens received in the lens-barrel 162. The second casing part 160b defines a light through hole 1600 therein and the middle of the light through hole 1600 also in the optical axis of the lens in the lens-barrel 162.

The focusing mechanism 164 is cylinder-shaped and defines a through hole therein. A focusing lever 1644 protrudes from an outer surface of the focusing mechanism 164 and a second screw thread structure 1642 is defined on an inner surface of the focusing mechanism 164. The second screw thread structure 1642 is engaged with the first screw thread 1624 on the outer surface of the lens-barrel 162. The focusing mechanism 164 is disposed in and fits with the casing 160 and can rotate in the casing 160. The casing 160 defines a second through hole 1604 in a sidewall thereof and the focusing lever 1644 extending through the second through hole 1604. The focusing lever 1644 is movable along the second through hole 1604. In use, the focusing lever 1644 is located between and driven by the two lever-driving portions 1482, 1484.

The image sensor 166 is mounted on the inner surface of the first casing part 160a and used for obtaining color image data emitting from the lens module 162. The image sensor 166 can be a charge coupled device (CCD) or a complementary metal-oxide-semiconductor (CMOS) transistor.

Figure 5:
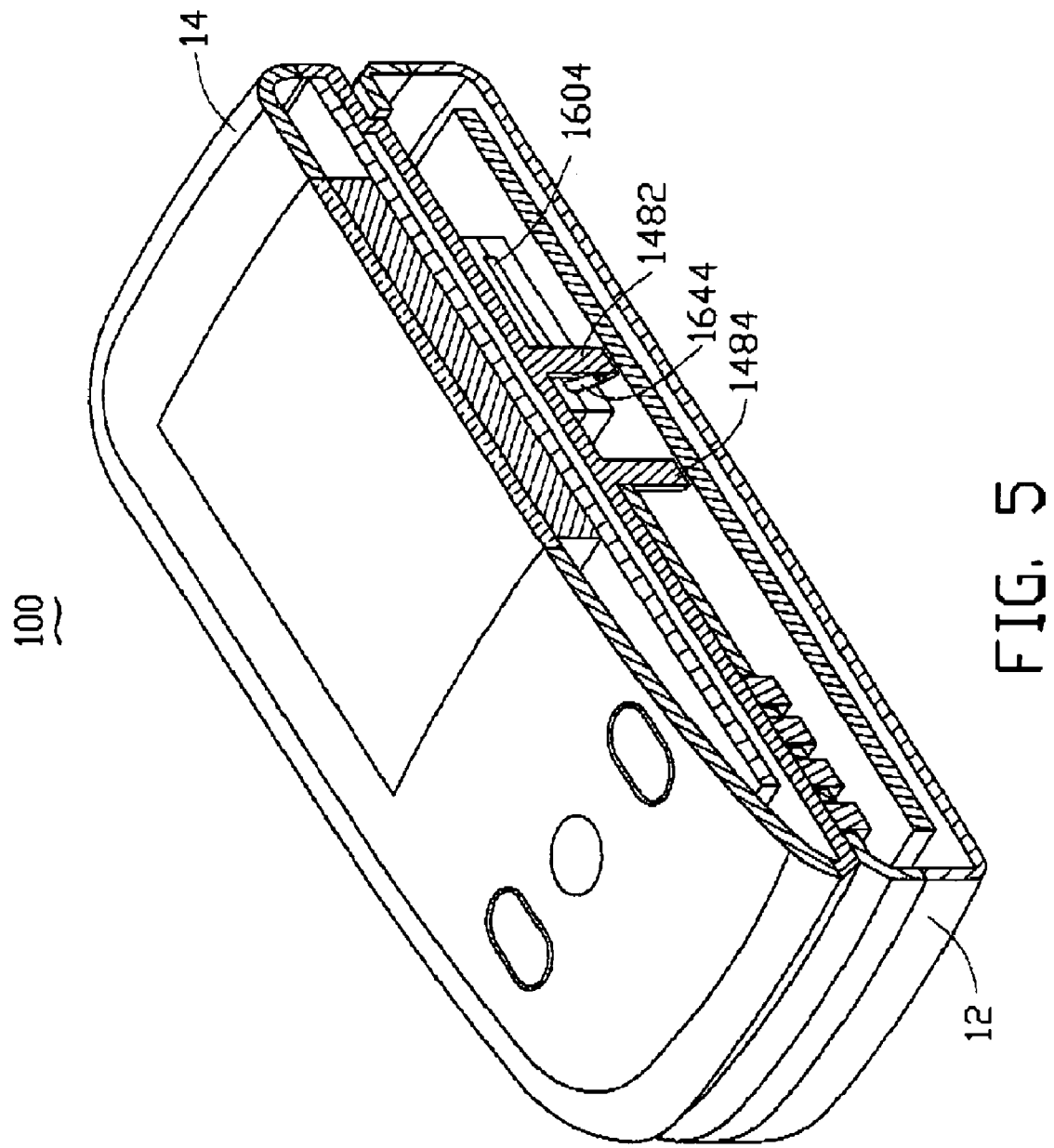
FIGS. 5 to 7 are schematic, cutaway view of a focusing process of the camera of the mobile communication device shown in FIG. 2.
Figure 6:
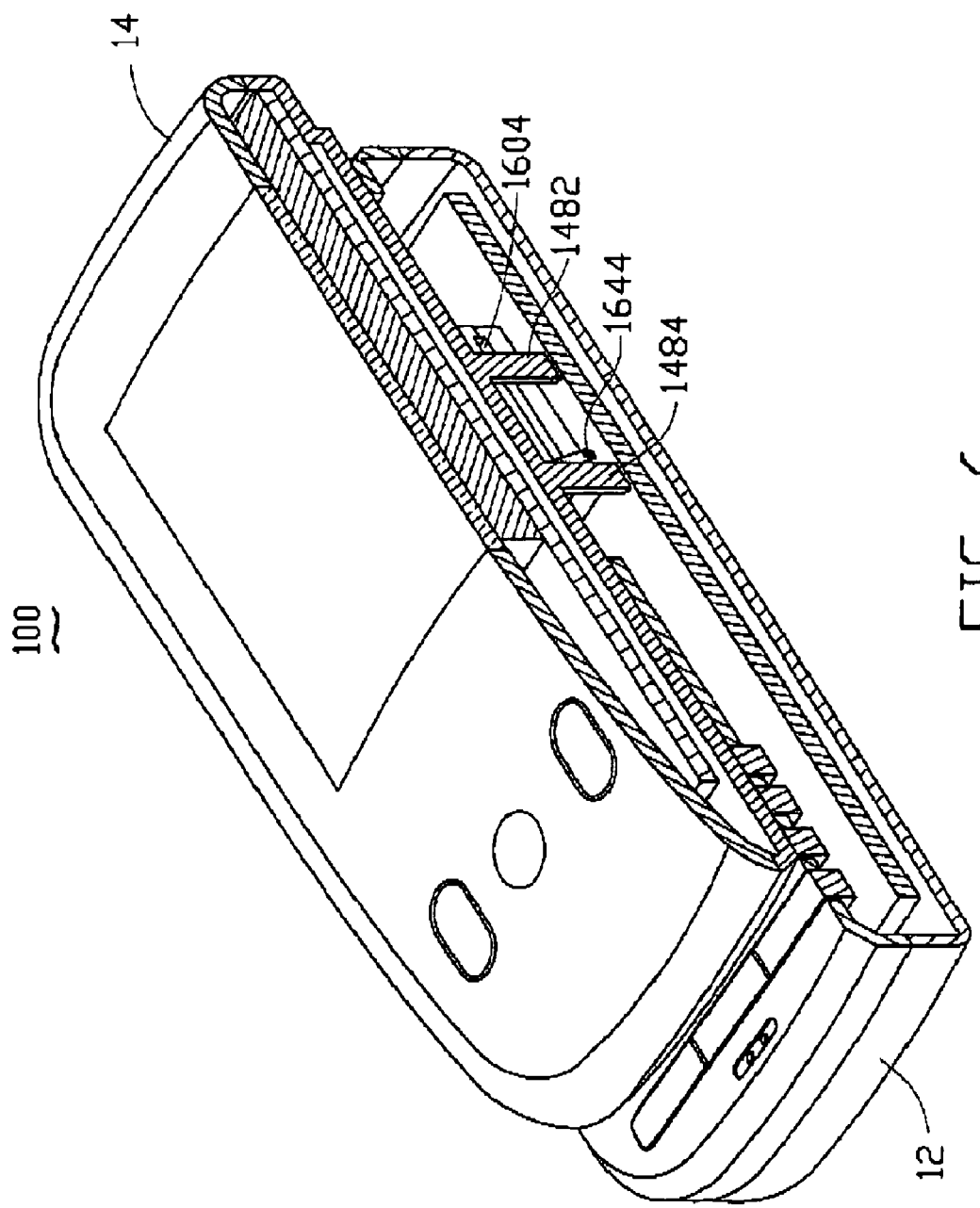
Figure 7:
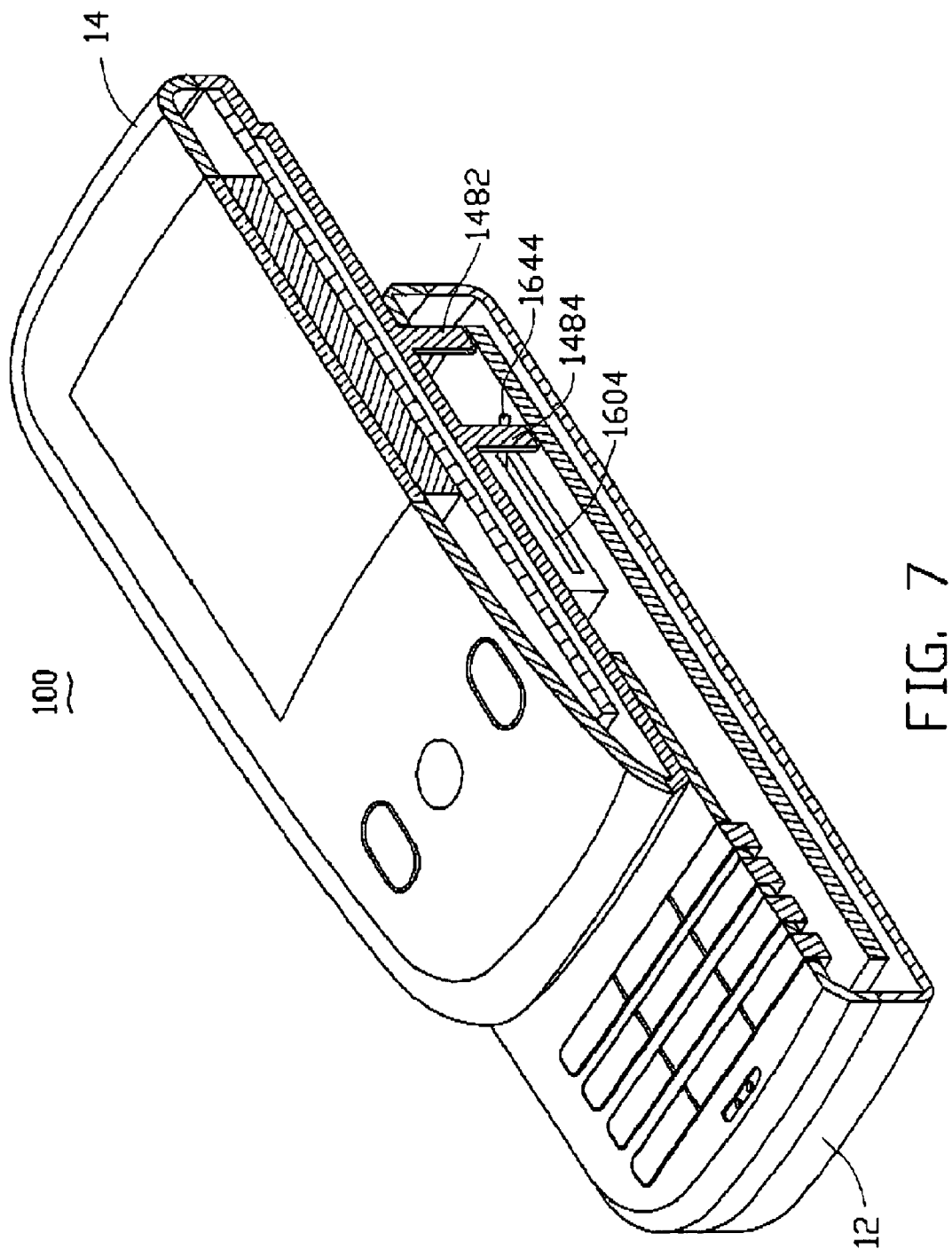

FIGS. 5 to 7 illustrate a focusing process of the camera module 16 shown in FIG. 4. The focusing process includes following steps.

Referring to FIG. 5, the mobile communication device 100 is in a closed but partially operable position. Here one end of the focusing lever 1644 is pointing at an inclined lower side of the second part 14. In addition, the focusing lever 1644 is adjacent to a lower side of the lever-driving portion 1482 and is located between the two lever-driving portions 1482, 1484. Here the second part 14 is at a first position and the focusing lever 1644 is at a first focusing position.

Referring to FIG. 6, the second part 14 slides relative to the first part 12 and the focusing lever 1644 contacts an upper side of the lever-driving portion 1484. At this time, the lever-driving portion 1484 begins to drive the focusing lever 1644 to move.

Referring to FIGS. 7 and 4, the focusing lever 1644 moves along the second through hole 1604 and the focusing mechanism 164 rotates based on the moving of the focusing lever 1644 connected with the focusing mechanism 164. Because the lens-barrel 162 cannot rotate, the focusing mechanism 164 drives lens-barrel 162 along the optical axis of the lens in the lens-barrel 162 formed by the engagement of the two screw thread structures 1624 and 1642. According to the above, the camera module 16 obtains a focusing function.

Here the second part 14 is at a second position and the focusing lever 1644 is at a second focusing position.

Figure 8:
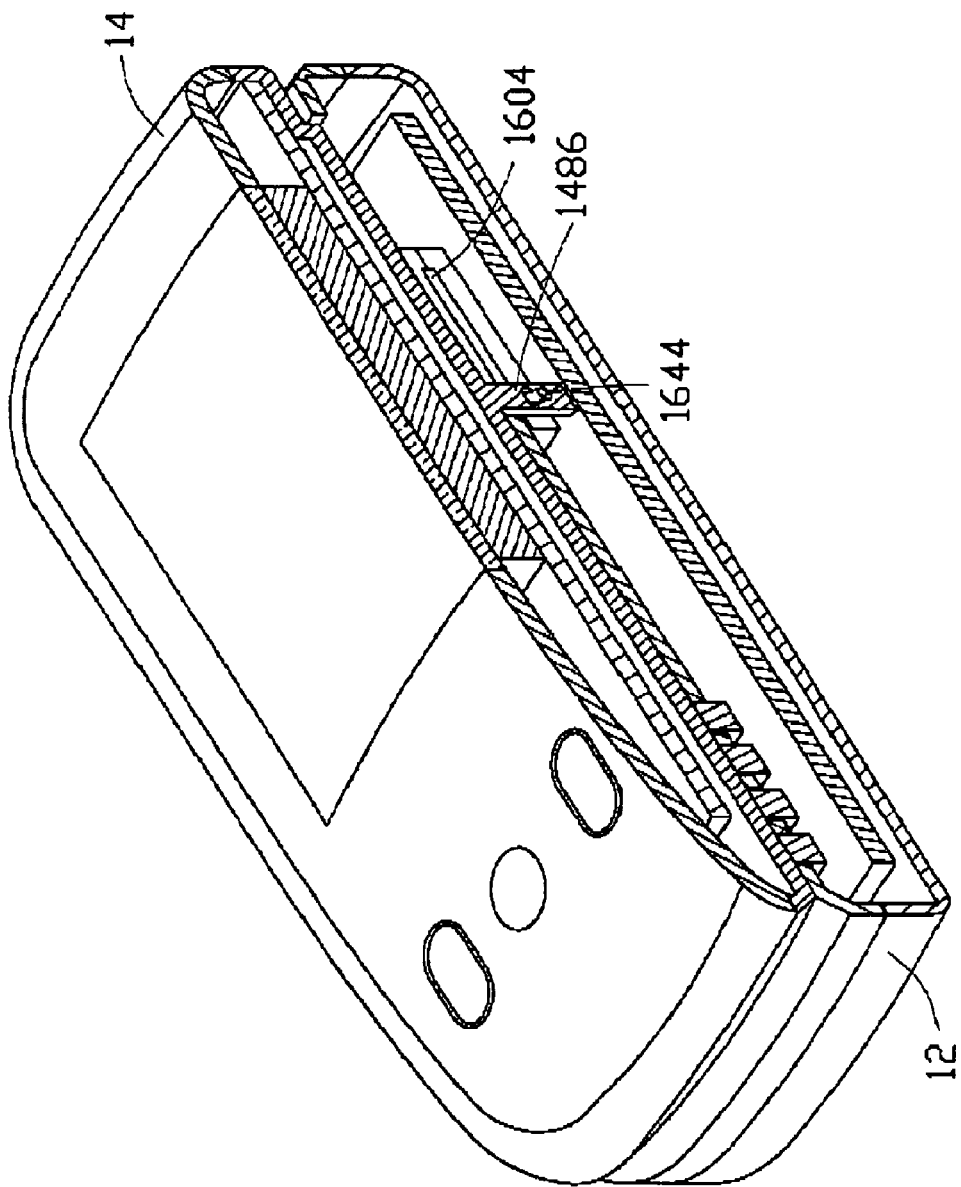
FIG. 8 is a schematic, cutaway view of a mobile communication device in accordance with another preferred embodiment.

Referring to FIG. 8, a mobile communication device 200 in accordance with another embodiment is illustrated. The mobile communication device 200 is approximately same as the mobile communication device 100, and the difference is that the mobile communication device 200 includes a lever-driving portion 1486 different from the lever-driving portions 1482 and 1484. The lever-driving portion 1486 defines a third through hole (not labeled) on the sidewall thereof and is configured for extension of the focusing lever 1644 thereby driving the focusing lever 1644 to rotate. It is to be understood that the lever-driving portion can be another mechanism structure which can drive the focusing lever 1644 to rotate.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A mobile communication device, comprising:
    a first part having a camera module mounted therein, the camera module comprising a lens-barrel and a focusing mechanism engaged with the lens barrel;
    a focusing lever protruding from an outer surface of the focusing mechanism; and
    a second part having a display module mounted therein, the second part being slidably attached to the first part between a first position and a second position, the second part having a first and second lever-driving portions for driving the focusing lever to rotate about a principal axis of the lens barrel relative to the lens barrel and rotate between a first focus position where the focusing lever is located adjacent to the first lever-driving portion and the second part is located in the first position, and a second focus position where the focusing lever is located adjacent to the second lever-driving portion and the second part is located in the second position 2. The mobile communication device as claimed in claim 1, wherein the camera module comprises a casing receiving the lens-barrel and the focusing mechanism therein.

3. The mobile communication device as claimed in claim 2, wherein the casing comprises a first casing part and a second casing part assembled to each other.

4. The mobile communication device as claimed in claim 3, wherein the first casing part includes a rotation-blocking protrusion and the lens-barrel defines a cutout, the rotation-blocking protrusion being configured for engagement in the cutout of the lens-barrel thereby preventing the lens-barrel from rotating.

5. The mobile communication device as claimed in claim 1, wherein the tens-barrel is threadedly engaged with the focusing mechanism.

6. The mobile communication device as claimed in claim 1, wherein the first and second lever-driving portions cooperatively form a through hole therein configured for extension of the focusing lever therethrough.

7. The mobile communication device as claimed in claim, 1, wherein the first part comprises a front cover and a back cover facing each other, the front cover defining a slot configured for extension of the focusing lever therethrough and rotating therein.

8. The mobile communication device as claimed in claim 3, further comprising an image sensor mounted on the first casing part.

9. The mobile communication device as claimed in claim 1, wherein the second part comprises a shutter button.

10. A mobile communication device, comprising:
a first part having a focusing camera module mounted therein, the focusing camera module comprising a lens assembly and a focusing mechanism for focusing of the lens assembly;
a focusing lever protruding from an outer surface of the focusing mechanism, the focusing lever being rotatable between a first focus position and a second focus position; and
a second part having a first and second lever-driving portions for driving the focusing lever to rotate about a principal axis of the lens barrel relative to the lens barrel and rotate between the first and second focus positions, the second part being attached to the first part and being slidable relative to the first part between a first position where the focusing lever is in the first focus position and is located adjacent to the first lever-driving portion, and a second position where the focusing lever is in the second focus position and is located adjacent to the second lever-driving portion.

11. The mobile communication device as claimed in claim 10, wherein the camera module comprises a casing receiving the lens-barrel and the focusing mechanism therein.

12. The mobile communication device as claimed in claim 11, wherein the casing comprises a first casing part and a second casing part assembled to each other.

13. The mobile communication device as claimed in claim 12, wherein the first casing part includes a rotation-blocking protrusion and the lens-barrel defines a cutout, the rotation-blocking protrusion being configured for engagement in the cutout of the lens-barrel thereby preventing the lens-barrel from rotating.

* * * * *